Nov. 9, 1948.   J. W. KARWEIT   2,453,137
METHOD OF DRILLING METAL AND THE LIKE
Filed Aug. 20, 1942   2 Sheets-Sheet 1
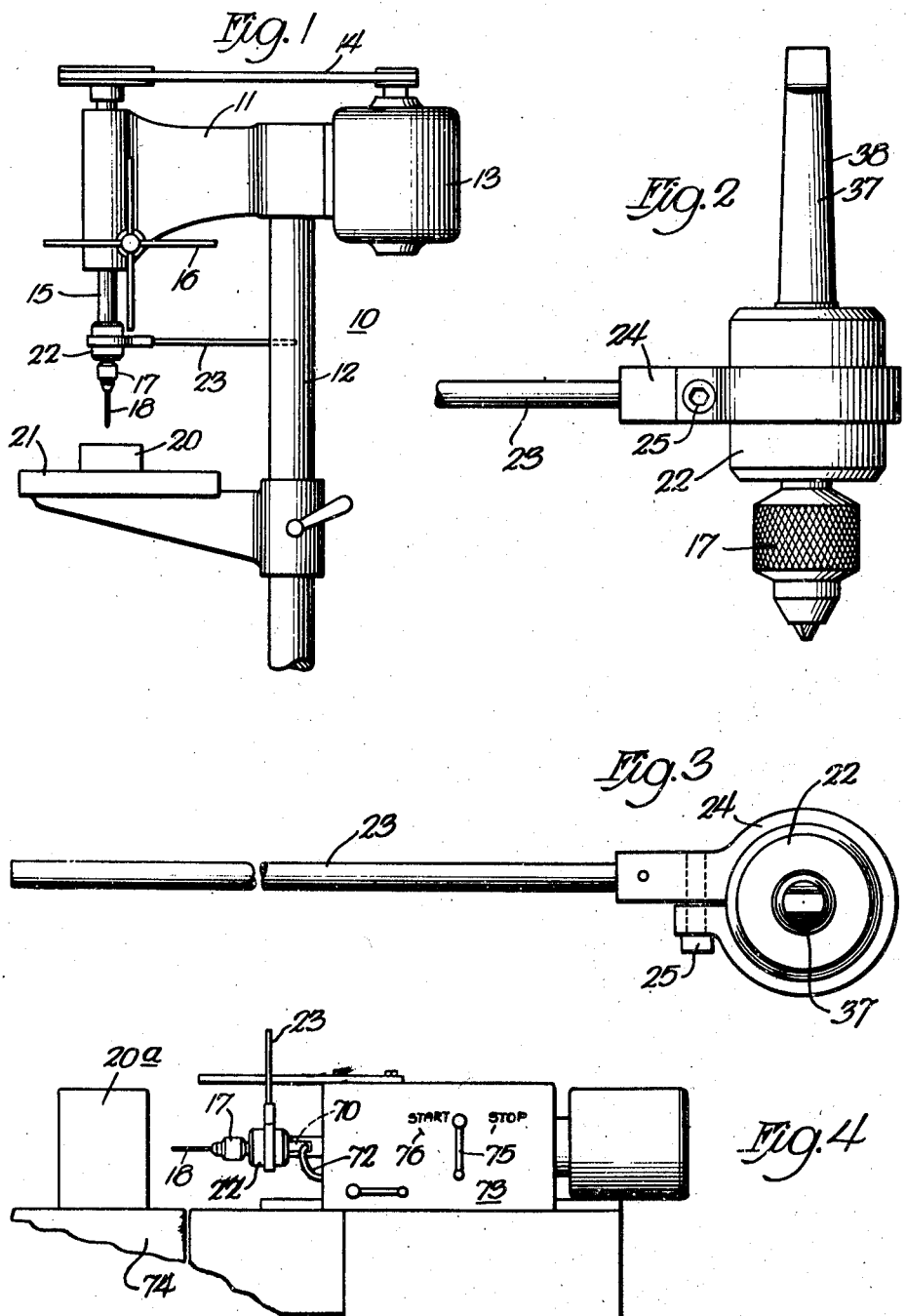
INVENTOR.
John W. Karweit Nov. 9, 1948. J. W. KARWEIT 2,453,137
METHOD OF DRILLING METAL AND THE LIKE
Filed Aug. 20, 1942 2 Sheets-Sheet 2

INVENTOR.
John W. Karweit
BY
ATTY.

Patented Nov. 9, 1948

2,453,137

UNITED STATES PATENT OFFICE 2,453,137

METHOD OF DRILLING METAL AND THE LIKE

John W. Karweit, River Grove, Ill., assignor, by mesne assignments, to Ex-Cell-O Corporation, Detroit, Mich., a corporation of Michigan Application August 20, 1942, Serial No. 455,417

14 Claims. (Cl. 77—5)

The present invention relates to the art of drilling and particularly to the twist drilling of metals such as pure copper or aluminum or the like.

As in the drilling of welding tips made of pure copper or bodies made of aluminum, it is seldom possible with holes over two or three diameters deep to complete the operation without withdrawing the drill point from the cut repeatedly to remove the metal shaving produced by the feed. Removing the drill tip from the work is work time consumed in the operation and is a burden upon production.

In the present invention the twist drill is vibrated axially at the same time that it is being fed into the work and this breaks the shaving into small pieces that are readily removed or clear themselves from the flutes without withdrawing the tip of the drill from the work.

One of the objects of the invention is to provide a new and improved method for deep hole drilling of metals of a soft and stringy nature.

A further object is to provide an improved method in which an end cutting tool, such as a twist drill, is advanced forwardly in a cutting feed relative to the work, and a slight axial reciprocation or oscillation between the tool and work is periodically superimposed on the cutting feed, each reciprocation consisting of a retract movement followed by a return movement sufficient in extent and frequency to effect severing or breaking of the chip being formed at the face of the cut.

Another object of the invention is to combine with the twist drilling operation the advantages of percussion feed.

A further object of the invention resides in the elimination of additional spindles or heads in multi stage automatic machining when heretofore additional heads have been required to pick up the cut where previous drills have left off in deep hole drilling. In the present invention a deep hole can be drilled at one station.

A general object of the invention is to eliminate difficulties inherent in conventional drilling of certain materials, speed up production, and provide improved wall finish, hole size and alignment regardless of hole depth and material involved.

Another object is to provide a method of drilling in which tool life is increased by separating the tool periodically from the face of the cut in the presence of lubricant so that both sides of each cutting edge will be bathed by the lubricant.

These being among the objects of the present invention, other and further objects and advantages will become apparent from the drawings, the description relating thereto and the claims.

Referring now to the drawings:

Fig. 1 is a side elevation of a hand feed drill press upon the quill of which a preferred embodiment of the invention is installed.

Fig. 2 is an enlarged side elevation of a preferred embodiment of the invention as it appears when assembled and ready for use.

Fig. 3 is an end view of the construction shown in Fig. 2.

Fig. 4 is a view similar to Fig. 1 illustrating a novel combination of an automatic forward traverse drill press with an axially vibrating twist drill for boring soft and stringy metals.

Figure 5:
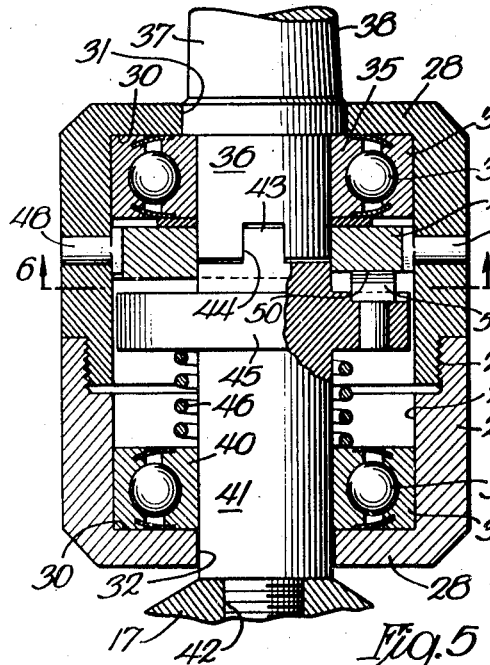
Fig. 5 is an enlarged vertical section of the device shown in Fig. 2 illustrating one form of the invention.

In the practice of the invention as illustrated in the several views the drill is the element which is feed traversed, and as already mentioned is reciprocated axially just enough to break the chips once every revolution of the drill. Although the timing of the reciprocation may be arranged to occur every first, second or third revolution or fraction thereof of the drill relative to the work as desired, whether or not a particular arrangement is employed in any particular design will depend upon the size of the chip that can be cleared by the flutes considering the metal machined, and the number of cutting edges on the drill. It is indicated at this time that the cuts made by the cutting edges of the drill should preferably overlap between successive reciprocations.

These reciprocations take place while a continuous feed traverse is maintained either by hand or automatically, it being intended that the size of the chips be small enough to be sure to clear the flutes. The greater the vibration that is set up by the reciprocations of the drill the greater the chips will be agitated in a manner preventing binding. This agitation operates also to move the earlier chips out of the flutes by the vibrating urging of the later chips following them.

More particularly, as shown in Fig. 1 the method constituting the present invention is adapted to be carried out by suitable apparatus, one form of which is shown herein as a drill press 10 having a drill head casing 11 mounted on the standard 12 where, upon one side it carries a motor 13 which drives through a V-belt 14 a quill 15 journalled in the casing 11 on the other side. The quill 15 is reciprocated for feed and return movements as controlled by a manual throw 16 and carries on its lower end a chuck 17 supporting a twist drill 18 over a work piece 20 that rests upon a table 21. If desired, a flow of lubricant or cutting oil may be provided to the work at the drilling location.

The device herein disclosed for carrying out the invention is disposed between the quill 15 and the drill chuck 17 where, as more particularly shown in Fig. 2, an outer casing 22 is held against rotation by an arm 23 resting against and sliding up and down on the standard 12 during feed movement of the drill. The arm 23 is secured to the casing 22 by means of a split collar 24 and clamp screw 25, and may be of any suitable size or shape to contact a stationary part without hindering the feed traverse.

The casing 22 is in two parts threaded together as at 26 and cooperating to provide a cylindrical compartment 27 terminating at opposite ends in flanges 28 extending radially inwardly to provide shoulders 30 and axially aligned openings 31 and 32 at the top and bottom of the casing, respectively.

The outer races 33 of frictionless bearings 34 are pressed into the cylindrical bore to rest snugly against the shoulders 30 and the inner race 35 of the upper bearing receives in supporting relation the lower end 36 of a shank member 37 having a conical upper end 38 such as a Morse taper receivable in the quill 15.

The inner race 40 of the lower bearing receives a spindle 41 threaded as at 42 to receive the conventional chuck 17, and has upon its upper end a tang 43 which engages in driven relationship in a kerf 44 upon the shank 36. Although a tang and kerf drive is shown, a spline or slip sleeve drive may be employed since the relationship shown is representative of a drive permitting relative axial movement during the drive.

A radial flange 45 is provided upon the spindle 41 and a compression spring 46 disposed between the flange and inner race 35 of the lower bearing acts to hold the tang in its driven position and the driven shaft upwardly to the extent permitted.

Figure 9:
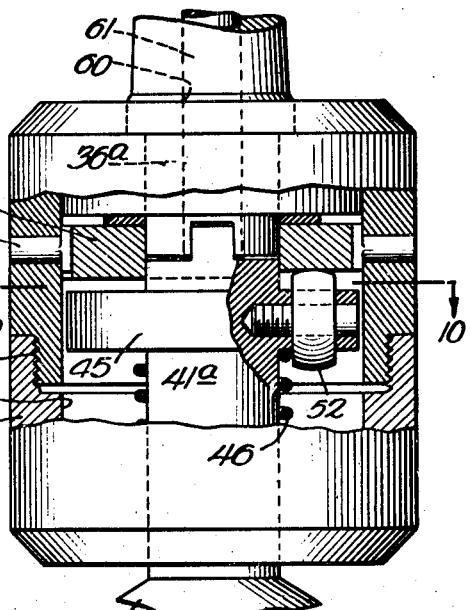
Fig. 9 is a view similar to Fig. 5 showing the preferred form of the cam and follower.
Figure 6:
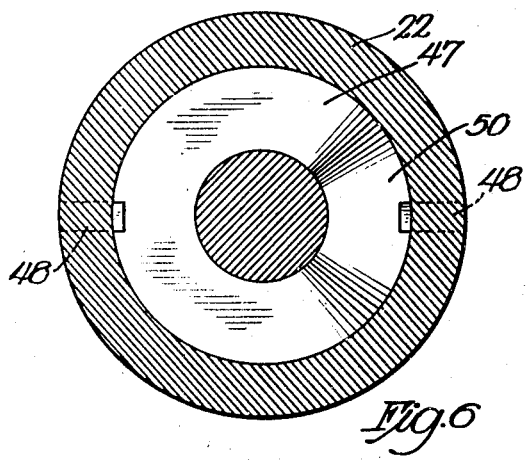
Fig. 6 is a section taken on line 6—6 in Fig. 5.
Figure 10:
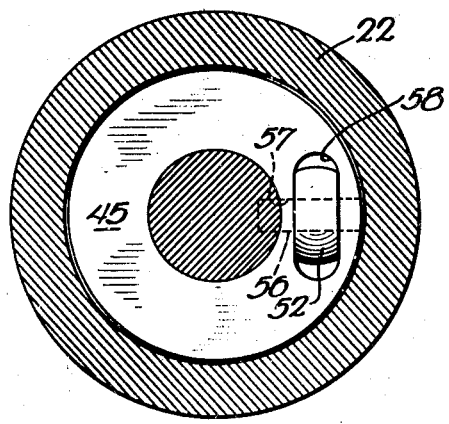
Fig. 10 is a section taken upon the line 10—10 in Fig. 5.
Figure 7:
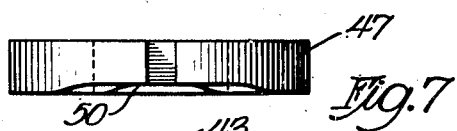
Fig. 7 is a view of the cam construction shown in Fig. 5.
Figure 8:
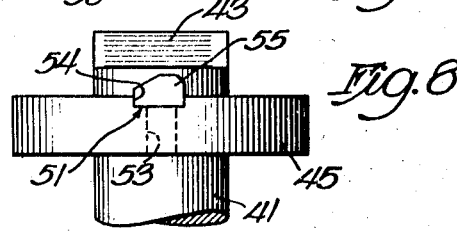
Figure 8 is a view of the follower construction shown in Figure 5.

Above the flange 45 a ring or washer 47 is locked rigidly in place in the casing 22 by set screws 48 and upon the bottom face thereof is provided a relieved portion 50 providing a depression serving as an axial cam (Fig. 6). Engaging the cam is a hardened pin 51 as shown in Fig. 5, or a roller 52, as shown in Fig. 9, which serves as a follower. In most instances for simplicity of construction the hardened pin will suffice but where through long and hard service, wear becomes an important factor, it is preferred to use the roller.

When using the pin 51, the flange is bored as at 53 and countersunk as at 54 to provide a configuration which prevents turning of the pin, the pin having a hardened head 55 which fits down into the countersink and from which position it is readily removable. In the case of the wheel, the axle 56 is disposed radially as received in a radial bore 57 that bisects transversely a cage opening 58 into which the roller is received. The periphery of the roller is preferably rounded to provide a line rolling contact with the cam, but it can be beveled and the cam correspondingly contoured to provide a wider contacting area if desired.

In the device shown in Fig. 9 the shank 36a is bored out as at 60 in its lower end to receive a rod like extension 61 upon the upper end of the spindle 41a so that alignment of the spindle with the shank is had at widely spaced support points, the spacing of the bearings providing in part this support characteristic and the extension 61 within the bore 60 serving in a like capacity.

In some installations, and by way of suggesting how the device can be used with a different timing of the reciprocation, the roller can be mounted on a piston 70 reciprocably movable axially with respect to the casing and washer 47. As shown in Fig. 4 the piston in turn can be reciprocated by a rotary cam or hydraulically by means of a transmission 72 connected into the main motor drive 73 to provide any timing desired for the reciprocable movement of the drill.

Furthermore, in connection with Fig. 4 if the drill shown is provided with a feed traverse into the work 20a to a depth greater than five diameters, this traverse can be had without interruption of the feed traverse. The work piece is one of many mounted upon an indexing table 74 to be operated upon at a plurality of stations. With the present invention extra heads are dispensed with at different stations as conventionally required to drill successively the same hole deeper and the head 73 and feed as shown drill a deep hole in the work piece at one station.

As the shaving is repeatedly severed into small chips during the drilling operation by the reciprocation of the drill as described periodically during or throughout the feed traverse, a vibratory or oscillatory condition is set up wherein the chips are kept in constant agitation. This agitation maintains a looseness beneficial to the chips clearing themselves through the flutes or being worked out by a flow of cutting oil generally supplied to drills where they are under continuous operation.

Because of this, the control 75 of the automatic head 73, shown in Fig. 4, can be moved to "start" 76 and the hole cut in a single traverse at one station and within the time permitted for each of the other heads to complete their cycles such as countersinking or tapping the work piece.

It will be seen that the device can be readily dismantled, repaired and assembled should any part be defective or alteration be desired. The direction of the threading between the two parts of the casing is counter-clockwise for tightening under use. For instance, if the upper part of the casing is clamped, the thread is left hand to tighten under the influence of the clockwise tendency imparted to the lower casing by drill rotation. Otherwise it is preferred to employ the split ring clamp to hold both parts in their mutually tightened relationship. Removal of the clamp and unthreading of the parts, opens the device and all parts to ready inspection.

When the invention is placed in operation, the cam and follower arrangement will cause the drill periodically to move to the upper limit permitted to it by the depth of the cam. Thereafter, the incline upon the cam immediately returns the drill to its cutting position. For this purpose, the spring 46 should be sufficiently strong to assure that the drill follows the contour of the cam to the extent that it is permitted to do so in the system. Chips are cut into uniform independent particles as fast as the cut progresses, and the particles find their way out through the drill flutes quite easily without the conventional need of pulling the drill out of the cut to clear the chips. In addition to this, and depending somewhat upon higher drilling speeds, if the drill is the part which is moved axially during the retraction of the drill from the face of the cut in workpiece, the drill is moved back and forth axially fast enough to establish a vibratory action that keeps the chip particles free and loose. The chips then clear the flutes readily as urged by the spiral upon the drill, and the lubricant reaches the bottom of the cut.

Moreover, the small chip particles are curled and individually compacted sufficiently tight that their friction with the wall is negligible. In this form the chips after clearing the bushings easily can be washed away to a depository by the lubricant, the fixture and work table being kept continuously clean even while the drilling operation is proceeding. Furthermore, is will be appreciated that the invention provides a new and improved method for the deep hole drilling of a wide miscellany of materials, especially metals and the like of a soft or stringy nature; and an improved continuous main forward cutting feed for twist drills and superimposition of an improved secondary feed characteristic upon the main forward feed traverse of a drill press or the like.

In addition to these advantages and results the invention eliminates additional spindles or heads in multistage automatic machining when heretofore additional heads have been required to pick up the cut where previous drills have left off in deep hole drilling. In fact, with the present invention a deep hole can be drilled at one station and in one pass, if desired.

Also, it will be seen that within the contemplation of the present invention there are many advantages in the safety to personnel from flying work-hardened chips or broken drills, and from the unpleasantness of splashing lubricant; improved operating conditions conducive to longer tool life; adaptability of the method for use with otherwise conventional equipment and drills; the liberty in fixture design to locate bushings directly against the work without impairing chip clearance; better hole alignment, wall finish and hole size; the availability of the chips for remelting or alloying, and for material analysis.

Thus from the description provided it will be seen how the objects and results of the invention are attained, and although certain forms and embodiments have been illustrated and described herein, it will be apparent to those skilled in the art that various uses, modifications and changes may be made without departing from the spirit and substance of the invention, the scope of which is commensurate with the appended claims.

The claims of the present application cover and are restricted to the method. The apparatus or device is covered in my copending application, Serial No. 484,612, filed April 26, 1943, to which reference may be had for a further exposition of the basic theory of drilling that is involved.

What is claimed is:

1. The method of comminuting chips formed by a rotary drill that is feed traversed into a work piece which includes the step of retracting the drill from its cutting position far enough to terminate the chip being formed and returning the drill to its cutting position to start another chip at least once every three revolutions of the drill and each time within a minor portion of a revolution of the drill.

2. The method of removing stock from a workpiece including rotating a pair of cutting edges about a predetermined axis of rotation to follow helical paths for the major portion of each complete revolution, and during the remaining portion of each revolution lifting the cutting edges from the work a distance enough to terminate the chips made by the cutting edges during said major portion of each revolution.

3. In the method of drilling a machinable material of the type described, which includes axially reciprocating the drill and material with respect to each other as often as once every one to three revolutions a distance sufficient for a cutting edge of the drill to cut free from the material momentarily, and supplying lubricant to the bottom of the cut to bathe and cool both sides of the cutting edge during the time the cutting edge is free of the material.

4. The method of drilling by power tool a workpiece made of a machinable material including rotating and feeding a drill and the workpiece with respect to each other, and axially reciprocating the drill and workpiece relative to each other to effect a separation thereof at least once every one to three relative revolutions of the drill and workpiece a distance approximately the thickness of the chips being formed.

5. The method of drilling a workpiece made of machinable material which includes continuously urging a fluted rotating drill and workpiece toward each other through a cutting feed and repeating during the cutting feed that step of dropping a fluted drill and the workpiece away from each other momentarily to sever the chips and returning them immediately to their cutting position each time within a minor portion of a revolution of the drill.

6. The method of breaking and removing chips from a cut during the drilling of a machinable material with a spirally fluted drill comprising cutting the chips into small chips of substantially uniform size and shape at the cutting edge of the drill by oscillating the drill quickly a distance substantially equal to the thickness of the chips, then passing the chips out of the cut through the flutes of the drill, and maintaining the chips in the flutes in a loose relationship by the vibration set up from said oscillating of the drill, and simultaneously supplying lubricant to the cutting edges of the drill to wash the chips from the drill flutes.

7. The method of drilling by power tool which includes rotating a fluted drill continuously, feeding the drill forward with respect to the work, and within a minor portion of revolution of the drill allowing the drill to retract momentarily at least once every few revolutions of the drill a distance sufficient to cut free of the work, and then forcing the drill to return a corresponding amount followed by continuous feed.

8. The method of drilling metal and the like which includes rotating a twist drill having a plurality of end cutting edges and a workpiece relative to each other, continuously imposing a relative approach cutting feed traverse between the drill and workpiece, and superimposing on said feed traverse a relative reciprocation between the drill and workpiece comprising a retract movement out of normal cutting position followed by a return movement into normal cutting position at least once each relative revolution between the drill and workpiece each time within a minor portion of said revolution through a distance sufficient to effect termination at the face of the cut of the chips being formed by the drill.

9. The method of drilling metal and the like which includes rotating a fluted drill and a workpiece relative to each other, continuously imposing a relative approach cutting feed traverse between the drill and workpiece, and superimposing on said feed traverse a relative reciprocation between the drill and workpiece comprising a retract movement out of normal cutting position followed by a return movement into normal cutting position at least once every one to three relative revolutions between the drill and workpiece each time within a minor portion of such revolution through a distance sufficient to effect termination at the face of the cut of the chips being formed by the drill.

10. The method of drilling metal and the like which includes rotating a fluted drill, continuously imposing a relative cutting feed on the drill to advance the drill through cutting engagement with a workpiece, and superimposing on said feed traverse a reciprocation of the drill comprising a retract movement out of normal cutting position followed by a return movement into normal cutting position at least once every one to three revolutions of the drill each time within a minor portion of a revolution of the drill through a distance sufficient to effect termination at the face of the cut of the chips being formed by the drill.

11. The method of drilling metal and the like which includes rotating a fluted drill and a workpiece relative to each other, continuously imposing a relative approach cutting feed traverse between the drill and workpiece, superimposing on said feed traverse a relative reciprocation between the drill and workpiece comprising a retract movement out of normal cutting position followed by a return movement into normal cutting position at least once every one to three relative revolutions between the drill and workpiece each time within a minor portion of such revolution through a distance sufficient to effect termination at the face of the cut of the chips being formed by the drill, and continuously supplying cutting lubricant to the drill to bathe the end of the drill at the face of the cut upon each such retract movement.

12. The method of forming a hole in metal and the like including rotating a tool having an end cutting edge and mounted for movement with a translatable support in relation to a workpiece, imparting a cutting feed traverse to the support toward the workpiece to advance the tool progressively through cutting engagement therewith, normally maintaining the tool in a predetermined projected cutting position with respect to the support, and during said feed traverse imparting to said tool a reciprocation with respect to the support comprising first a retract movement out of said cutting position and then a return movement to said cutting position through a distance sufficient to effect breaking of the chips being formed at the face of the cut, at least once every few revolutions of the tool and each time within a minor portion of a revolution of the tool.

13. The method of drilling a hole in metal and the like including rotating a fluted drill having an end cutting edge and mounted on a support for relative movement therewith in relation to a workpiece, imparting a relative cutting feed traverse between the support and workpiece to advance the tool progressively through cutting engagement with the workpiece, normally maintaining the tool in a predetermined projected cutting position with respect to the support, and during said feed traverse imparting to said tool a reciprocation with respect to the support comprising first a retract movement out of said cutting position and then a return movement to said cutting position through a distance sufficient to effect breaking of the chips being formed at the face of the cut, at least once every one to three revolutions of the tool and each time within a minor portion of a revolution of the tool.

14. The method of drilling metal and the like including rotating a fluted twist drill having two end cutting edges and two longitudinal spiral flutes in a translatable support, imparting a continuous cutting feed traverse to the support to advance the drill endwise through cutting engagement with a workpiece, normally constraining the tool for positive movement with the support in the direction of said feed traverse to generate a spiral cut in the workpiece, during the feed traverse reciprocating the tool relative to the support in a retract movement followed by a return movement through a distance sufficient to effect breaking of the chips at the face of the cut at least once every third revolution of the tool and each time within a minor portion of a revolution of the tool, whereby the severed chips are maintained in a state of agitation and caused to move outwardly through the flutes, and bathing the cutting edges of the drill with cutting lubricant upon each reciprocation of the drill.

JOHN W. KARWEIT.

REFERENCES CITED

The following references are of record in the file of this patent:

UNITED STATES PATENTS

| Number | Name | Date |
| --- | --- | --- |
| 463,973 | Palmer | Nov. 24, 1891 |
| 1,196,656 | Bugbee | Aug. 29, 1916 |
| 1,523,629 | Bullock | Jan. 20, 1925 |
| 1,852,736 | Connell | Apr. 5, 1932 |
| 1,884,396 | Uecker | Oct. 25, 1932 |
| 2,073,518 | Hirvonen | Mar. 9, 1937 |
| 2,234,452 | Rehnberg | Mar. 11, 1941 |